United States Patent
Bloomer, Jr. et al.

(10) Patent No.: US 7,509,383 B1
(45) Date of Patent: Mar. 24, 2009

(54) REMOTE CONFIGURATION OF AUTOMATIC RESPONSE SETTINGS

(75) Inventors: Richard A. Bloomer, Jr., Round Rock, TX (US); Manjunath B. Muttur, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/114,248

(22) Filed: May 2, 2008

Related U.S. Application Data (63) Continuation of application No. 12/027,015, filed on Feb. 6, 2008, now Pat. No. 7,386,595.

(51) Int. Cl.
*G06F 15/16* (2006.01)
(52) U.S. Cl. .................. 709/206; 709/203; 709/217; 709/219; 709/221; 709/224; 709/225
(58) Field of Classification Search .................. 709/203, 709/206, 218, 219, 221, 224
See application file for complete search history.

(56) References Cited

U.S. PATENT DOCUMENTS

| 7,218,926 | B2 | 5/2007 | Bocking et al. |
| 2002/0099681 | A1 | 7/2002 | Gainey et al. |
| 2003/0120733 | A1* | 6/2003 | Forman .................. 709/206 |
| 2005/0198173 | A1 | 9/2005 | Evans |
| 2006/0075038 | A1 | 4/2006 | Mason et al. |

* cited by examiner

*Primary Examiner*—Yves Dalencourt
(74) *Attorney, Agent, or Firm*—Cantor Colburn LLP; Libby Handelsman (57) ABSTRACT

A system is provided for remotely configuring automatic reply message settings. The system comprises an email server configured to receive email messages addressed to an email address allocated for a user. The email server is configurable to generate an automatic reply message in response to receiving email messages addressed to the email address, to examine each received email message addressed to the email address for one or more specified conditions, and to execute one or more specified actions configuring settings for the automatic reply message when the one or more specified conditions are met by a received email message addressed to the email address.

2 Claims, 4 Drawing Sheets

REMOTE CONFIGURATION OF AUTOMATIC RESPONSE SETTINGS

CROSS-REFERENCE TO RELATED APPLICATION

This application is a continuation of U.S. patent application Ser. No. 12/027,015, filed Feb. 6, 2008, the disclosure of which is incorporated by reference herein in its entirety.

BACKGROUND OF THE INVENTION

1. Field of the Invention

Exemplary embodiments of the present invention relate to electronic messaging, and more particularly, to configuration of automatic responses to electronic messages.

2. Description of Background

In computer communication networks, one method of communication is electronic mail (email), in which a sending user prepares and sends a message over some form of computer network to a receiving user, usually on a remote system. Most email client applications, which are front-end computer programs that are typically used to maintain a message list identifying messages received for reading and processing by the recipient, also provide software to facilitate writing, replying to, forwarding, deleting, and filing emails. Because email messages can be sent at any time across the world as easily as across the office, to a group of people or a single recipient, without the user leaving his or her desk, email can provide considerable benefits over traditional paper based memos and postal systems. Email has become a ubiquitous means of communication for both business and personal use.

Many email client applications also include additional functions or utilities with configurable settings. These functions may provide for, for example, message filtering, message redirection, directing a copy of a message to be saved in a particular folder, automatic message signature settings, and autoresponders to generate automatic answers such as "out-of-office" or "vacation" reply messages in response to incoming messages on behalf of a recipient who does not expect be reading or only intermittently reading email. For example, during periods of travel for a user, out-of-office autoreply messages can be provided to inform the senders of incoming messages to an email address registered for the user that the messages are unlikely to be read, or acted on, in a timely manner. This is typically implemented by allowing users to specify a variety of parameters such as the time period during which the user is away, the content of the out-of-office autoreply, the list of users to whom the out-of-office autoreply is to be sent if mail is received from them, and the like. A user of such a client application can thus enable or disable an out-of-office autoreply message setting for sending a pre-composed reply email message from an email address registered for the user in response to a message addressed to the email address being received by the client application. Such out-of-office autoreply message settings are typically configurable on a personal computer via a client email application, such as, for example, Microsoft Outlook or IBM's Lotus Notes.

While autoreply messages can be useful for their intended purpose, the configuration and management of the settings for such messages can be a nuisance. The settings must be manually configured each time a change is desired in the manner of handling communications when the intended receiver does not wish to be interrupted or is otherwise unavailable. Situations can arise in which a user is unable to access the email client application used to maintain his or her email account through a terminal or client system. For instance, the email server for the client application may be implemented behind an organizational firewall that does not permit access through external networks, and the user may suddenly fall sick and be unable to go to the office to access the email server through the internal network, in which case the user will be unable to configure the out-of-office autoreply message settings.

Accordingly, it is desirable to provide a mechanism for remotely controlling out-of-office autoreply message settings for an email account when direct access to the client application for the email account is not available.

SUMMARY OF THE INVENTION

The shortcomings of the prior art can be overcome and additional advantages can be provided through exemplary embodiments of the present invention that are related to a system for remotely configuring automatic reply message settings. The system comprises an email server configured to receive email messages addressed to an email address allocated for a user. The email server is configurable to generate an automatic reply message in response to receiving email messages addressed to the email address, to examine each received email message addressed to the email address for one or more specified conditions, and to execute one or more specified actions configuring settings for the automatic reply message when the one or more specified conditions are met by a received email message addressed to the email address.

The shortcomings of the prior art can also be overcome and additional advantages can also be provided through exemplary embodiments of the present invention that are related to methods, computer program products, and data processing systems corresponding to the above-summarized system are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of exemplary embodiments of the summarized invention, technically we have achieved a solution that can be implemented to provide a mechanism enabling remote configuration of settings for autoreply messages that are generated by an email server for an email address on behalf of a user registered to that email address. Exemplary embodiments can be implemented to enable a user registered to an email address to remotely configure autoreply messages setting for that email address without having to directly access the email server for the email address to change the autoreply message settings (such as by logging into a client application provided on a client platform that is communicatively coupled to the email server).

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Figure 1:
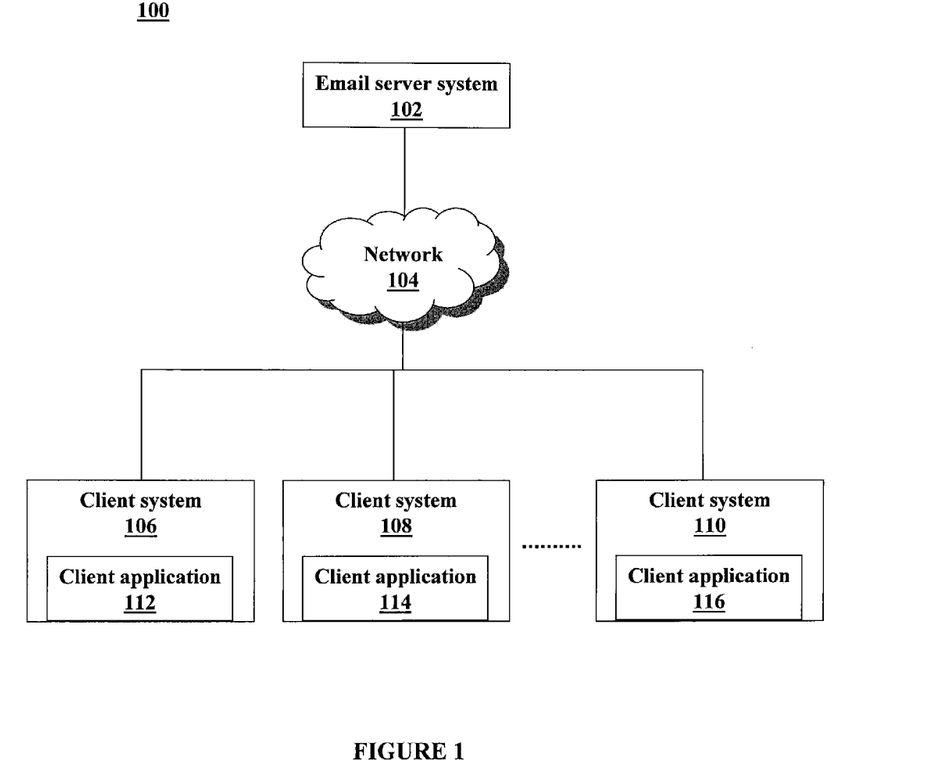
FIG. 1 is a block diagram illustrating an exemplary email system within which exemplary embodiments of the present invention can be implemented.

Referring now to FIG. 1, an email system 100 within which exemplary embodiments of the present invention can be implemented is illustrated. Hereinafter, the term "email" refers to various kinds of electronic mail. For example, the email may be a text email, a voice email, a video email, or the like. Exemplary email system 100 includes an email server system 102 and a number of client systems or platforms 106, 108, 110 operatively connected to email server system 102 via an interconnect network 104. It should be noted that the present exemplary embodiment is non-limiting. Exemplary embodiments of the present invention can be implemented in email systems that include any number of similar or different email servers and any number of similar or different email clients operatively connected together via a network. In exemplary embodiments, the email server(s) and the client application(s) can communicate with each other following a client-server model and rely on the Transmission Control Protocol (TCP) for reliable delivery of information or applications between servers and client applications.

In exemplary embodiments, network 104 may be any suitable network type, such as, for example, personal area network (PAN), local area network (LAN), or wide area network (WAN), and the network may also utilize any suitable hardware technology to connect devices such as, for example, optical fiber, Ethernet, ISDN (Integrated Services Digital Network), T-1 or T-3 link, FDDI (Fiber Distributed Data Network), cable or wireless LMDS network, Wireless LAN, HomePNA, Power line communication, or telephone line network.

Each of client platforms 106, 108, 110 is a user terminal or other client system or device implementing software for and running a respective email client application (that is, 112, 114, 116). In exemplary embodiments, each of client platforms 106, 108, 110 may be a personal computer system or a non-traditional-computer digital device such as a personal digital assistant, a pager, a cellular phone, and the like. Client applications 112, 114, 116 may also be referred to as email applications or simply clients and may be implemented in a variety of ways. Examples of email client applications include Microsoft Outlook, IBM's Lotus Notes, Netscape Communicator (or Netscape 8.0), and the AOL 9.0 interactive service software (which includes the email function). Other examples of email client applications include Mozilla thunderbird, and web-mail clients such as gmail, hotmail, and the like.

In the present exemplary embodiment, email server system 102 is implemented by email server software running on a computer system, which can be, for example, a server computer, a workstation computer, a mainframe computer, or a super-computer. The computer system may also comprise a number of computers connected together via a network. Email server 102 may therefore exist as multiple separate logical and/or physical units, and/or as multiple servers acting in concert or independently, wherein each server may be comprised of multiple separate logical and/or physical units. The email server software may be, for example, the Microsoft Exchange email server software, IBM's Lotus Domino, the Sun/AOL iPlanet Messaging Server, or the like.

In exemplary embodiments, email server system 102 can be configured to interact with non-web client applications, web client applications, or both. Email server 102 may also be configured to function autonomously, that is, with no client. The functions of email server system 102 include managing email addresses, receiving email messages, delivering queued email messages to client applications, and forwarding email messages to their appropriate destinations. The user of each of email client applications 112, 114, 116 is registered with an email address, and email server 102 is configured to forward messages among the client applications 112, 114, 116 based on email addresses specified in the messages. Email server 102 can additionally comprise one or more user information stores that contain information about each user of email client applications 112, 114, 116. The one or more information stores can be used to manage interactions between email server 102 and client platforms 106, 108, 110.

When a user having a particular email address logs into email system 100 through a client application, the client application assumes the email address registered for the logged-in user. The client application then communicates with email server 102 to receive all email messages sent to that particular email address using, for example, the Post Office Protocol (POP) or the Internet Message Access Protocol (IMAP). The user may also send email messages from that email address to other email addresses via the client application.

During periods when a user of one of client applications 112, 114, 116 will not be checking or will only be intermittently checking messages sent to an email address managed by email server 102 (for example, when the user is traveling or sick), the user can be provided with the option of configuring the email server to provide out-of-office autoreply messages or alerts on behalf of the user to inform senders of incoming messages to the email address registered for the user that the incoming messages are unlikely to be read, or acted on, in a timely manner. For example, a user of Microsoft Outlook can configure automated "Out of Office" messages using the "Out of Office Assistant" setup to automatically respond to incoming email messages. In exemplary embodiments, this option can be implemented by allowing the user to specify a variety of parameters such as, for example, the time period during which the user is away, the content of the out-of-office autoreply, the list of users to whom the out-of-office autoreply is to be sent if mail is received from them, and the like. The user can thus enable or disable an out-of-office autoreply message setting for an email address for sending a pre-composed reply email message in response to a message addressed to the email address being received by the client application.

Exemplary embodiments of the present invention can be implemented to provide a mechanism through which a user can remotely configure the out-of-office autoreply message option settings for a particular email address registered for the user. In exemplary embodiments, this remote configuration can be achieved by having the user send an email message having particular identifying contents to the email address for which the out-of-office autoreply message settings are to be configured. Such an email message can, for example, have particular contents instructing the email server to enable the out-of-office message option for the email address. Exemplary embodiments can thus be implemented to provide a mechanism through which a user can configure the out-of-office autoreply message settings for an email address without accessing a client system or platform that is operatively connected to the email server for the email address. Rather, the user can access a different client system or platform to generate and send an email message to the email address containing instructions for configuring the out-of-office option settings for that email address from another email address.

Figure 2:
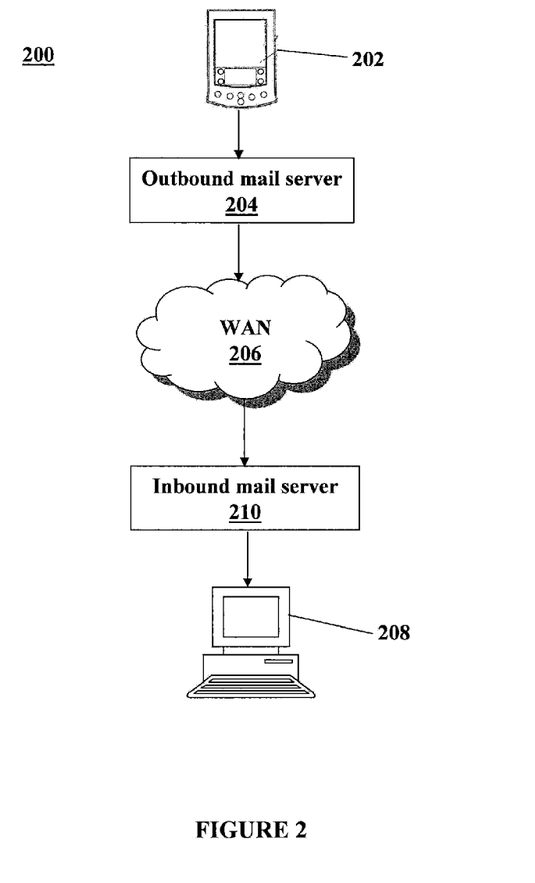
FIG. 2 is a block diagram illustrating an exemplary embodiment of a general system for sending and handling email messages in accordance with the present invention.

Referring now to FIG. 2, a block diagram illustrating an exemplary embodiment of a general system 200 for sending and handling email messages containing autoreply message configuration instructions for a receiving email address is shown. In the present exemplary system, a sending client platform 202, which is a system or device running an email client application that is operated by a user and owned by, managed by, operated by, or otherwise associated with an outbound email server 204, is connected directly or indirectly through one or more networks to a wide area network (WAN) 206 (for example, the Internet). The user can thus operate the email client application running on sending client platform 202 to compose email messages and to send the messages from a sending email address. For purposes of illustrating a simple example, a single sending client platform is shown in FIG. 2. In exemplary embodiments, however, there may be any number of client systems or platforms all communicatively coupled to WAN 206 and each running an email client application that may be used to send email messages.

In the present exemplary embodiment, a receiving client system or platform 208 is also connected to WAN 206. Receiving client platform 208 is configured to run an email client application that is owned by, managed by, operated by, or otherwise associated with an inbound email server 210 and can be operated by the user to access messages delivered to the receiving email address. For purposes of illustrating a simple example, a single receiving client platform is shown in FIG. 2. In exemplary embodiments, however, there may any number of receiving client systems or platforms each communicatively coupled to WAN 206 through inbound email server 210 and each configured to run an email client application that may be operated by the user to access messages delivered to the receiving email address.

In exemplary embodiments, WAN 206 can be a circuit switched network, such as the Public Service Telephone Network (PSTN), a packet switched network (which can be a wide area network (WAN), such as the global Internet, a private WAN, a telecommunications network or any combination of the above-mentioned networks), a wired network, a wireless network, a broadcast network, or a point-to-point network.

In exemplary embodiments, the systems of client platforms 202 and 204 can be any of a wide range of suitable computing devices having Internet access and providing email capabilities such as one or more personal computers (PCs) (for example, IBM or compatible PC workstations running the Microsoft Windows operating system or Linux OS, Macintosh computers running the Mac OS operating system, or equivalent), Personal Digital Assistants (PDAs) and other handheld or portable electronic devices, palm top computers, mobile handsets, smart phones, game consoles, or any other suitable information processing devices.

Often, a user will not have access to a personal computer (for example, when the user is traveling). In the present exemplary embodiment, sending client platform 202 is depicted as a handheld electronic device. Numerous types of handheld electronic devices are known. Examples of such handheld electronic devices include, for instance, PDAs, handheld computers, two-way pagers, cellular telephones, mobile handsets, and the like. In general, a handheld electronic device can comprise small general computing device having a processing unit that is capable of running one or more application programs (such as an email client application), a display, and an input mechanism that is typically something other than a full-size keyboard. The input mechanism may be, for example, a keypad, a touch-sensitive screen, a track ball, a touch-sensitive pad, a miniaturized QWERTY keyboard, or the like. A handheld electronic device may also feature wireless communication capability.

In exemplary embodiments, the email client applications running on sending client platform 202 and receiving client platform 208 can be any of a myriad of email clients, which can range from proprietary email clients (thick clients) to web-based interfaces that retrieve email messages in which the user agent function is provided by a Web server and/or a back-end program (for example, a CGI program) running on the same system as the corresponding email server. At any time, the user can operate the email client application running on sending client platform 202 to compose one or more email messages containing autoreply message configuration instructions and to cause outbound email server 204 to send the one or more messages for delivery to the receiving email address. The one or more configuration messages are received at inbound email server 210 and can be retrieved by the email client application running on receiving client platform 208.

Each email server 204, 210 may comprise any type of general-purpose messaging gateway, also known as a Message Transfer Agent (MTA), mail relay, email relay, email router, Simple Mail Transfer Protocol (SMTP) server, QMQP server, or email gateway, which is specially programmed to perform email message routing functions. Generally, when a message is delivered to a messaging gateway, the gateway must determine whether it can deliver the message locally to its own message store or if it must route the message to another messaging gateway. If the message is sent to another messaging gateway, the other messaging gateway must make the same decisions about the message—deliver locally or route to yet another messaging gateway. In this way, messages are routed throughout, for example, the Internet, until they reach the intended recipient. After a message is successfully delivered to and stored on the correct messaging gateway, the recipient can then retrieve the message. For purposes of illustrating a simple example, one of each email server is shown in FIG. 2. In practical exemplary embodiments, however, there may be any number of outbound, inbound, and intermediate messaging gateways, and the use of any number of such elements is contemplated. In exemplary embodiments, the systems of the one or more messaging gateways can be a server system such as, for example, SUN Ultra workstations running the SunOS operating system, IBM RS/6000 workstations and servers running the AIX operating system, or an IBM zSeries eServer running z/OS, z/VM or Linux OS.

In exemplary embodiments, when a new email message arrives for delivery to the receiving email address, inbound email server 210 can be configured to process the message according to one or more processing rules defined by the user. Email processing rules are user-defined instructions for managing incoming and outgoing email messages. Rules execute specific tasks when user-defined criteria are met. Each rule includes conditions and actions, and may also include exceptions. "Conditions" are the criteria that are available for making new rules. A rule will not be executed unless its conditions are satisfied. "Actions" are the events that occur when the rule's conditions are met. Each rule typically contains at least one condition and one action. "Exceptions" allow a user to identify criteria or conditions that will prevent a rule from executing. For instance, these rules can provide a mechanism for preventing spam and other unnecessary email messages from clogging the mailbox for the receiving email address. An example of such a rule would be one defined to instruct email server 210 to direct a message to a separate folder if the message is from a particular sender, in which case the email server would be configured to inspect the email addresses of the senders of received messages to determine whether each message is from that particular sender. Another example of such a rule would be one defined to instruct email server 210 to delete an email message if the body of the message contains a particular keyword, in which case the email server would be configured to parse the body section of received message to determine if the message contains that particular keyword.

In the present exemplary embodiment, when a new email message arrives for delivery to the receiving email address, inbound email server 210 can be configured to process the message according to rules defined by the user that instruct the email server to configure the autoreply message settings in a certain manner when the received message satisfies certain conditions. For example, such a rule may instruct email server 210 to enable or disable an autoreply message if the received message is sent from a particular email address and/or if the received message contains particular terms in a particular format (for example, a password or other specific keyword selected by the user). In exemplary embodiments, such a rule may also be implemented to instruct email server 210 to configure other autoreply settings by, for example, setting the time period during which the autoreply message is to be sent, creating or editing the content of the autoreply message, setting the list of users to whom the autoreply message is to be sent if mail is received from them, setting an alternative email address to which received messages are to be sent, and performing other like actions, if the received message satisfies certain conditions. Once such a rule is defined by the user, email server 210 will be configured retrieve configuration instructions from received email messages and execute the specific action specified by the configuration instructions. In this manner, the user is simply required to the send a configuration email message that conforms to a set of predefined conditions for such messages, and does not need to directly access the email server for the email address to change the autoreply message settings (such as by logging into a client application through a client system or platform that is communicatively coupled to the email server).

Figure 3:
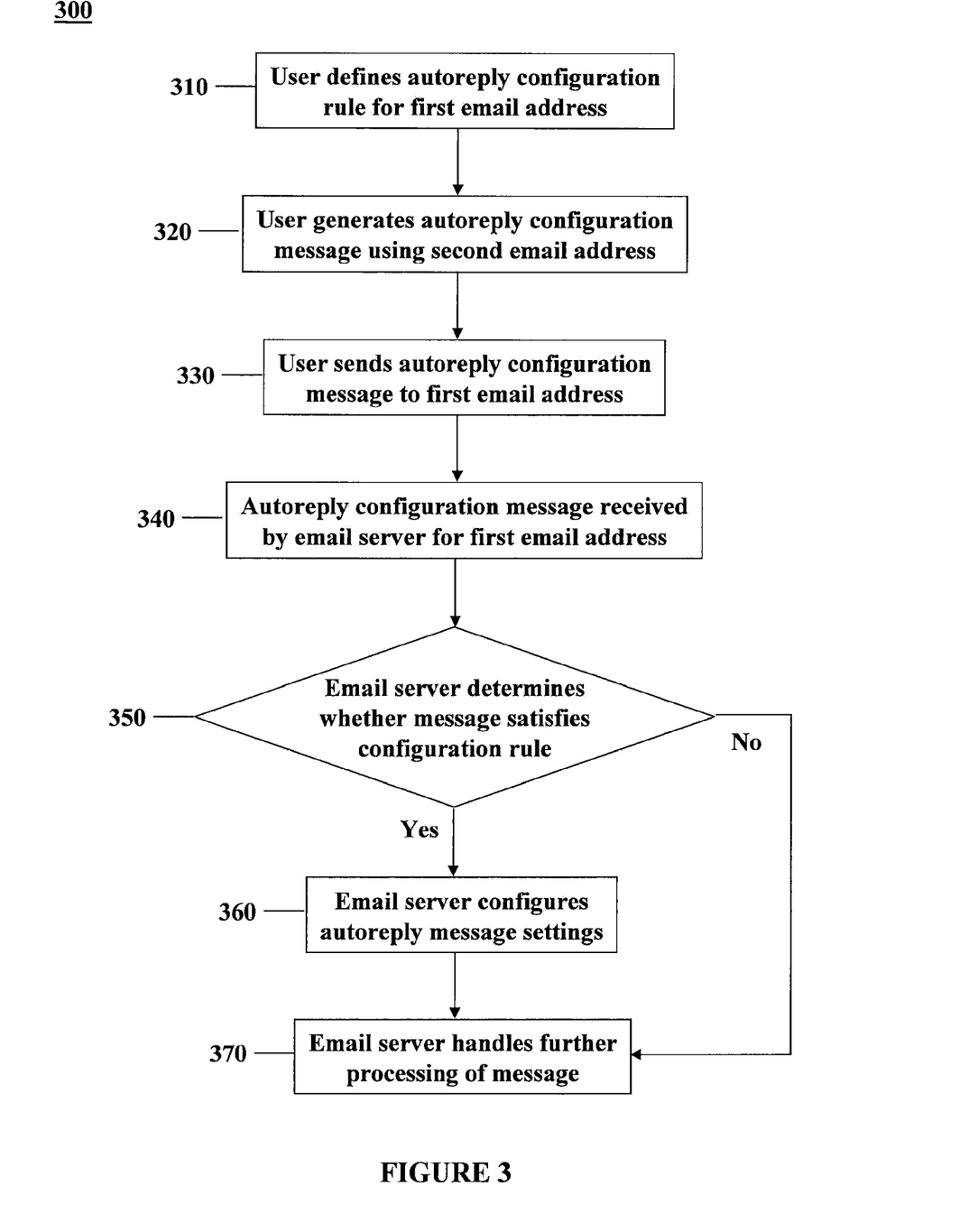
FIG. 3 is a flow diagram illustrating an exemplary embodiment of a general process of remotely configuring autoreply message settings for a receiving email address in accordance with the present invention.

Referring now to FIG. 3, a flow chart illustrating an exemplary embodiment of a general process 300 for remotely configuring autoreply message settings for a receiving email address is shown. At block 310, a user that is logged into an email client application for a first email address defines a rule instructing the inbound email server for the first email address to configure autoreply message settings in a certain manner when messages addressed to the first email address are received and satisfy certain conditions. With the mail rule now configured at the inbound email server, the user will now be able to configure the autoreply message settings for the first email address in a desired manner. When it is so desired, the user, at block 320, logs into a client application for a second email address and generates an email message containing autoreply message configuration instructions according to the rule defined at block 310. In exemplary embodiments, such a configuration message may be generated in a variety of ways. For example, the user may manually type the configuration instructions into an email message using a standard email editor as provided by the client application for the second email address. At block 330, the user transmits the configuration message to the email server for the first email address. To do so, the user may, for example, operate the client application to cause the outbound email server for the second email address to send the message for delivery to the first email address.

In the present exemplary embodiment, at block 340, the configuration message arrives at inbound email server for the first email address. At decision block 350, the inbound email server accesses the received message to determine if the message satisfies the conditions for the rule defined at block 310. For example, the email server can be configured to authenticate the received message according to the particular identifying contents according to the rule defined at block 310. Such an authentication may be performed in a variety of ways, with different levels of security. In one exemplary embodiment, the rule defined at block 310 can instruct the email server to determine whether the subject header or body of the email message includes a password, a particular digital signature, or other identification mechanism. If the email server determines that the message satisfies the predefined conditions, then the email server, at block 360, configures the autoreply message settings for the first email address according to the rule defined at block 310. For example, the email server can be configured to parse the received message to retrieve certain configuration instructions, and then configure autoreply message settings according to the configuration instructions in the message. In exemplary embodiments, these configuration instructions may be provided as an attachment to the email message, or may be provided as text contained in the body of the email message. In other exemplary embodiments, the rule defined at block 310 can instruct the mail serve to perform a specified configuration action (for example, enabling or disabling the autoreply message) whenever a message satisfying the predefined conditions is received.

At block 370, the email server can handle the message in a usual manner, such as by delivering the message to the mailbox for the first email address. In exemplary embodiments, the email server for the second email address may be also configured to generate a confirmation reply message in response to any autoreply configuration email messages received confirming execution of the configuration action according the rule defined at block 310. For example, the email server may transmit this reply back to the sending email address of the configuration message, or may transmit the reply to a different email address (for instance, an email address specified according to rule defined at block 310). Such a confirmation message could inform the sender that the configuration message was received and understood, and that the autoreply message settings were reconfigured properly. This confirmation message could also serve as a time stamp for the configuration action or an indication of whether the configuration message was a mistake or maliciously sent by another. In exemplary embodiments, the email server could also be configured to discard of received configuration messages after configuring the autoreply message settings accordingly.

Exemplary embodiments of the present invention can be implemented to provide a mechanism enabling remote configuration of settings for autoreply messages that are generated by an email server for an email address on behalf of a user registered to that email address. Exemplary embodiments can thus be implemented as an email server-based system or software component, which may act cooperatively or in conjunction with an email client system or software component, or with web documents or web applets in a web browser, for which interactions may occur over a communications link or network. Exemplary embodiments can be implemented within any such email system or software that is capable of enabling users to configure automated responses.

Exemplary embodiments of the present invention can be implemented to enable a user registered to an email address to remotely configure autoreply message settings for that email address without having to directly access the email server for the email address to change the autoreply message settings (such as by logging into a client application through a client system or platform that is communicatively coupled to the email server). Rather, the use of email messages as a configuration mechanism as described herein in relation to exemplary embodiments allows a user having access to virtually any client system or platform with a link to the Internet and email capabilities, whether coupled or decoupled to the web server, to remotely configure the autoreply message settings, even where the email server is shielded by a packet-filtering router, a proxy-based firewall, or any other network security system.

Examples of such autoreply messages for which exemplary embodiments of the present invention can be implemented include "out-of-office" or "vacation" reply messages that are generated in response to incoming email messages on behalf of a recipient who does not expect be reading or only intermittently reading email. Exemplary embodiments can also be implemented to enable remote configuration of settings for other types of autoreply messages such as, for example, those utilized by business enterprises as email marketing tools to immediately provide a follow-up to customer inquiries made by email and those utilized by providers of electronic mailing lists to confirm subscriptions, unsubscriptions, posts, and other list activities.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embodied in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 4:
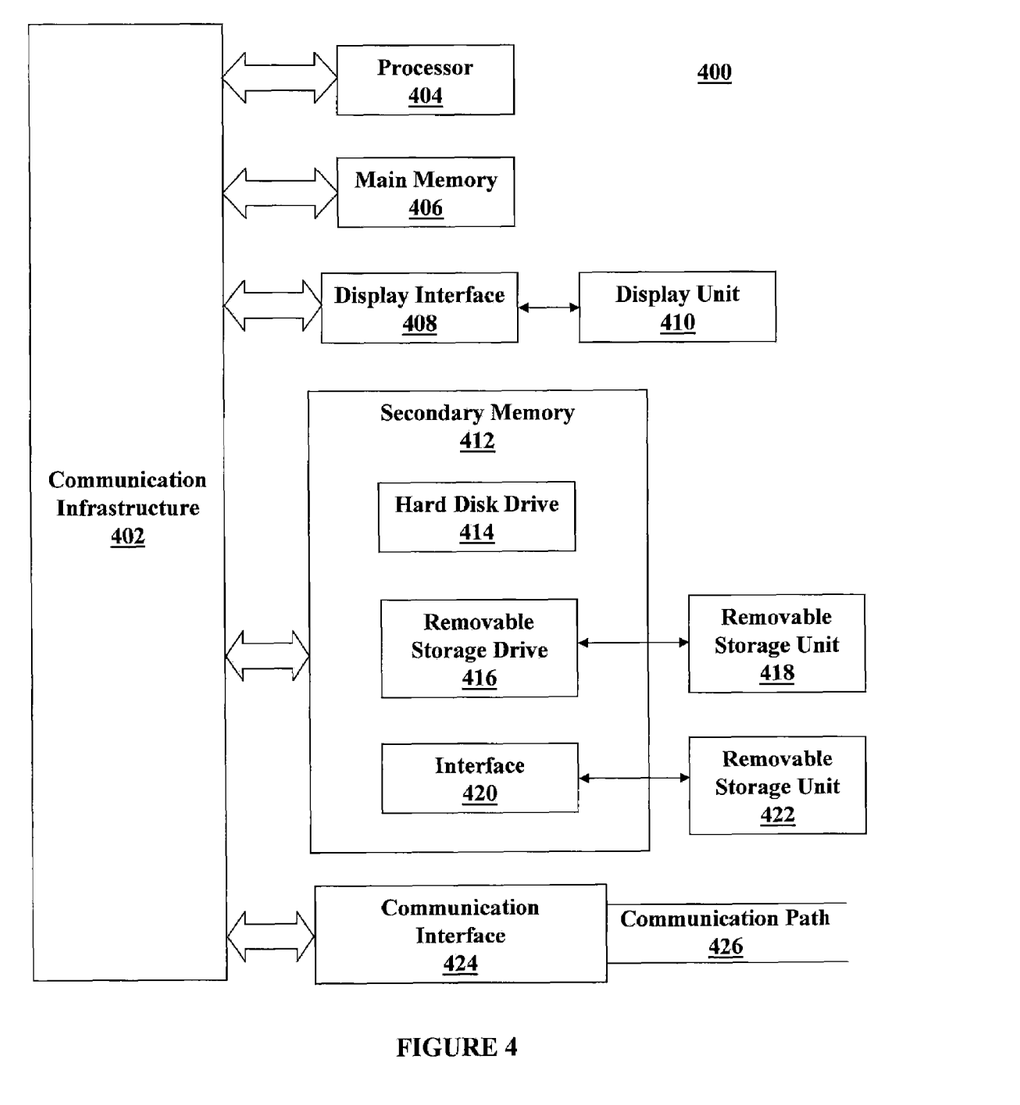
FIG. 4 is a block diagram illustrating an exemplary computer system that can be used for implementing exemplary embodiments of the present invention.

FIG. 4 is a block diagram of an exemplary computer system 400 that can be used for implementing exemplary embodiments of the present invention. Computer system 400 includes one or more processors, such as processor 404. Processor 404 is connected to a communication infrastructure 402 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 400 can include a display interface 408 that forwards graphics, text, and other data from the communication infrastructure 402 (or from a frame buffer not shown) for display on a display unit 410. Computer system 400 also includes a main memory 406, which can be random access memory (RAM), and may also include a secondary memory 412. Secondary memory 412 may include, for example, a hard disk drive 414 and/or a removable storage drive 416, representing a floppy disk drive, a magnetic tape drive, an optical disk drive, etc. Removable storage drive 416 reads from and/or writes to a removable storage unit 418 in a manner well known to those having ordinary skill in the art. Removable storage unit 418, represents, for example, a floppy disk, magnetic tape, optical disk, etc. which is read by and written to by removable storage drive 416. As will be appreciated, removable storage unit 418 includes a computer usable storage medium having stored therein computer software and/or data.

In exemplary embodiments, secondary memory 412 may include other similar means for allowing computer programs or other instructions to be loaded into the computer system. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between the computer system and external devices. Examples of communications interface 424 may include a modem, a network interface (such as an Ethernet card), a communications port, a PCMCIA slot and card, etc. Software and data transferred via communications interface 424 are in the form of signals which may be, for example, electronic, electromagnetic, optical, or other signals capable of being received by communications interface 424. These signals are provided to communications interface 424 via a communications path (that is, channel) 426. Channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 406 and secondary memory 412, removable storage drive 416, a hard disk installed in hard disk drive 414, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allows a computer to read such computer readable information.

Computer programs (also called computer control logic) are stored in main memory 406 and/or secondary memory 412. Computer programs may also be received via communications interface 424. Such computer programs, when executed, can enable the computer system to perform the features of exemplary embodiments of the present invention as discussed herein. In particular, the computer programs, when executed, enable processor 404 to perform the features of computer system 400. Accordingly, such computer programs represent controllers of the computer system.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A system for remotely configuring automatic reply message settings, the system comprising:
    an email server configured to:
    receive email messages addressed to an email address allocated for a user, the email server is configured by the user using a first email client application running on a first client platform that is communicatively coupled to the email server, wherein the received email message is generated using a second email client application running on a second client platform that is communicatively decoupled from the email server;
    process the received email message according to one or more processing rules defined by the user;
    generate an automatic reply message in response to receiving email messages addressed to the email address;
    examine each received email message addressed to the email address for one or more specified conditions;
    execute one or more specified actions configuring settings for the automatic reply message when the one or more specified conditions are met by a received email message addressed to the email address; wherein the one or more specified conditions are selected from being sent from one or more specified email addresses, containing one or more specified strings of text in a specified format, containing a particular digital signature, and combinations thereof, and wherein the one or more specified actions are selected from enabling the automatic reply message, disabling the automatic reply message, setting a time period during which the automatic reply message is to be generated, creating a block of text to be included in the automatic reply message, editing a block of text to be included in the automatic reply message, setting a list of email addresses to which the automatic reply is to be sent, and combinations thereof; and wherein at least one of the one or more specified actions is determined according to a set of instructions included in the received email message and retrieved by the email server.

2. The system of claim 1, wherein the second client platform being a device selected from personal computers, Personal Digital Assistants (PDAs), handheld computing devices, portable computing devices, palm top computers, mobile handsets, cellular phones, smart phones, game consoles, and combinations thereof.

\* \* \* \* \*